United States Patent
Li et al.

(10) Patent No.: US 11,304,244 B2
(45) Date of Patent: Apr. 12, 2022

(54) DEVICES AND METHODS FOR CONNECTION ESTABLISHMENT IN WIRELESS NETWORK

(71) Applicant: Telefonaktiebolaget LM Ericsson (publ), Stockholm (SE)

(72) Inventors: Xiaoming Li, Shanghai (CN); Hui Gu, Shanghai (CN); Qiong Song, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/052,715

(22) PCT Filed: May 4, 2018

(86) PCT No.: PCT/CN2018/085657
§ 371 (c)(1),
(2) Date: Nov. 3, 2020

(87) PCT Pub. No.: WO2019/210514
PCT Pub. Date: Nov. 7, 2019

(65) Prior Publication Data
US 2021/0235518 A1 Jul. 29, 2021

(51) Int. Cl.
*H04W 76/11* (2018.01)
*H04W 60/04* (2009.01)
*H04W 72/04* (2009.01)

(52) U.S. Cl.
CPC .......... *H04W 76/11* (2018.02); *H04W 60/04* (2013.01); *H04W 72/0486* (2013.01)

(58) Field of Classification Search
CPC ....... H04W 4/70; H04W 76/10; H04W 76/11; H04W 8/08
See application file for complete search history.

(56) References Cited

U.S. PATENT DOCUMENTS

2014/0051466 A1* 2/2014 Yu ........................ H04W 8/06
455/466
2018/0035351 A1 2/2018 Kodaypak
(Continued)

FOREIGN PATENT DOCUMENTS

CN 106982473 A 7/2017

OTHER PUBLICATIONS

3GPP TS 29.128 V15.2.0 (Mar. 2018), 3rd Generation Partnership Project; Technical Specification Group Core Network and Terminals; Mobility Management Entity (MME) and Serving GPRS Support Node (SGSN) interfaces for interworking with packet data networks and applications (Release 15), Mar. 2018 (51 pages).
(Continued)

*Primary Examiner* — Dung Hong
(74) *Attorney, Agent, or Firm* — Rothweil, Figg, Ernst & Manbeck, P.C.

(57) ABSTRACT

A method in a SCEF is provided. The method comprises receiving a message indicating that non-IP data is to be delivered to a UE. The method further comprises retrieving information associated with a MME serving the UE. The method further comprises transmitting, to the MME, a message triggering establishment of a connection between the SCEF and the MME for delivering the non-IP data. Other devices and methods for connection establishment between MME and SCEF are also provided.

13 Claims, 5 Drawing Sheets

(56) References Cited

U.S. PATENT DOCUMENTS

| | | | |
|---|---|---|---|
| 2018/0279115 A1* | 9/2018 | Tanna | H04W 8/22 |
| 2018/0332636 A1 | 11/2018 | Lu et al. | |
| 2018/0352593 A1* | 12/2018 | Velev | H04L 67/12 |
| 2019/0166016 A1* | 5/2019 | Livanos | H04L 67/26 |
| 2019/0200178 A1* | 6/2019 | Sudarsan | H04L 65/1063 |
| 2019/0253875 A1* | 8/2019 | Vittal | H04W 8/08 |
| 2019/0306753 A1* | 10/2019 | Uchida | H04W 28/04 |
| 2020/0146077 A1* | 5/2020 | Li | H04W 76/10 |
| 2020/0288515 A1* | 9/2020 | Gupta | H04W 76/12 |

OTHER PUBLICATIONS

Cisco Systems Inc., "Ultra IoT C-SGN Guide, StarOS Release 21.3," Sep. 5, 2017 (188 pages).

International Search Report and Written Opinion issued in international Application No. PCT/CN2018/085657 dated Jan. 30, 2019 (9 pages).

ZTE, "Corrections for Non-IP Data Delivery Procedures", SA WG2 Meeting #116, S2-163499, Vienna, Austria, Jul. 11-15, 2016 (9 pages).

Samsung, "Update for Solution 4a: Non-IP small data transmission via SCEF", SA WG2 Meeting #11, S2-153699, Chengdu, P.R. China, Oct. 19-23, 2015 (4 pages).

ZTE et al., "Support for APN Rate Control", 3GPP TSG CT4 Meeting #73, C4-163289, Osaka, Japan, May 23-27, 2016 (10 pages).

3GPP TS 29.128, V15.0.0 (Sep. 2017), 3rd Generation Partnership Project; Technical Specification Group Core Network and Terminals; Mobility Management Entity (MME) and Serving GPRS Support Node (SGSN) interfaces for interworking with packet data networks and applications (Release 15), Sep. 2017 (51 pages).

3GPP TS 29.336, V15.0.0 (Sep. 2017), 3rd Generation Partnership Project; Technical Specification Group Core Network and Terminals; Home Subscriber Server (HSS) diameter interfaces for interworking with packet data networks and applications (Release 15), Sep. 2017 (65 pages).

3GPP TS 23.682, V15.2.0 (Sep. 2017), 3rd Generation Partnership Project; Technical Specification Group Services and System Aspects; Architecture enhancements to facilitate communications with packet data networks and applications (Release 15), Sep. 2017 (122 pages).

3GPP TS 23.401, V15.2.0 (Dec. 2017), 3rd Generation Partnership Project; Technical Specification Group Services and System Aspects; General Packet Radio Service (GPRS) enhancements for Evolved Universal Terrestrial Radio Access Network (E-UTRAN) access (Release 15), Dec. 2017 (404 pages).

* cited by examiner

DEVICES AND METHODS FOR CONNECTION ESTABLISHMENT IN WIRELESS NETWORK

CROSS REFERENCE TO RELATED APPLICATION(S)

This application is a 35 U.S.C. § 371 National Stage of International Patent Application No. PCT/CN2018/085657, filed May 4, 2018, designating the United States.

TECHNICAL FIELD

The disclosure relates generally to wireless communications, and more particularly, to devices and methods for connection establishment in a wireless network.

BACKGROUND

Nowadays, Cellular Internet of Things (CIoT) Evolved Packet System (EPS) communication system has been developed rapidly. As a part of CIoT EPS optimization on control plane nodes, Data over NAS (NoNAS) is designed for efficient small data transfer between User Equipment (UE) and Mobility Management Entity (MME) via NAS messaging. In addition, small data transfer is optimized using Non-IP Data delivery (NIDD). UE may transfer, via the MME, non-IP data to the network by using DoNAS.

SUMMARY

In an aspect of the disclosure, a method in a Service Capability Exposure Function, SCEF, is provided. The method comprises receiving a message indicating that non-IP data is to be delivered to a UE. The method further comprises retrieving information associated with a MME serving the UE. The method further comprises transmitting, to the MME, a message triggering establishment of a connection between the SCEF and the MME for delivering the non-IP data.

The proposed scheme ensures that services triggered by, for example, an application server can be provided for a specified UE even there is no connection between MME and SCEF for non-IP data delivery. The SCEF is capable of finding the right MME serving the specified UE. Establishment of connection between SCEF and MME for non-IP data delivery can be triggered by the SCEF when, for example, downlink data packets arrive at the SCEF.

In an embodiment, retrieving information associated with the MME may comprise transmitting to a Home Subscriber Server (HSS) a message requesting routing information for the MME, and receiving a message including the routing information from the HSS.

In an embodiment, the method may further comprise performing authorization and/or load control before retrieving information associated with the MME. Thus the SCEF may decide whether establishment of connection between SCEF and MME can be triggered based on the result of authorization and/or load control.

In an embodiment, transmitting the message triggering establishment of a connection between the SCEF and the MME may comprise transmitting a Connection-Management-Request (CMR) message to the MME. The CMR message requests establishment of the connection between the SCEF and the MME for delivering the non-IP data. In addition, the method may further comprise receiving a Connection-Management-Answer (CMA) message indicating that the connection can be established from the MME. The CMA message may include EPS bearer information.

In an embodiment, transmitting the message triggering establishment of a connection between the SCEF and the MME may comprise transmitting a message notifying the MME that non-IP data is requested to be delivered to the UE. In addition, the method may further comprise receiving a message indicating that the delivery request of non-IP data to the UE is accepted by the MME.

In a further embodiment, the method may further comprise receiving a CMR message from the MME, the CMR message requesting establishment of the connection between the SCEF and the MME for delivering the non-IP data. The method may further comprise transmitting a CMA message indicating that the connection can be established to the MME.

In a further aspect of the disclosure, a method in a MME is provided. The method may comprise receiving a CMR message from a SCEF which message requests establishment of a connection between the SCEF and the MME for delivering non-IP data to a UE. The method may further comprise performing paging procedure for the UE.

In an embodiment, performing paging procedure for the UE may comprise performing International Mobile Subscriber Identification (IMSI) paging if the MME does not have context information for the UE. Alternatively, the CMR message may be rejected if the UE cannot be paged.

In an embodiment, the method may further comprise transmitting a CMA message indicating that the connection can be established to the SCEF. The CMA message may include EPS bearer information.

In a further aspect of the disclosure, a method in a MME is provided. The method may comprise receiving, from a SCEF, a notification message notifying that non-IP data is requested to be delivered to a UE. The method may further comprise determining whether the delivery request of non-IP data to the UE is accepted based on reachability of the UE.

In an embodiment, the method may further comprise transmitting a message to the SCEF indicating that the delivery request of non-IP data to the UE is accepted if the UE is reachable.

In an embodiment, the method may further comprise transmitting a message to the SCEF indicating that the delivery request of non-IP data to the UE is not accepted if the UE is not reachable. The message may include an element indicating requested re-transmission time for the notification message.

In an embodiment, the method may further comprise transmitting a CMR message to the SCEF, the CMR message requesting establishment of a connection between the SCEF and the MME for delivering the non-IP data.

Additionally, the method may further comprise receiving a CMA message from the SCEF indicating that the connection can be established.

In a further aspect of the disclosure, a SCEF is provided which comprises a processor and a memory coupled to the processor. The memory contains instructions executable by the processor whereby the SCEF is operative to perform the methods in accordance with the aspects of the disclosure.

In a further aspect of the disclosure, a MME is provided which comprises a processor and a memory coupled to the processor. The memory contains instructions executable by the processor whereby the MME is operative to perform the methods in accordance with the aspects of the disclosure.

In a further aspect of the disclosure, a computer program comprising computer program code means is provided. The computer program code means may cause, when executed on a processor, the processor to perform the methods in accordance with the aspects of the disclosure.

In a further aspect of the disclosure, a computer readable storage medium is provided. The computer readable storage medium has stored thereon the computer program in accordance with the aspects of the disclosure.

With the proposed schemes of the disclosure, non-IP data delivery to UE can be triggered by SCEF if there is no connection for such data delivery between SCEF and MME. In addition, the SCEF can re-establish the connection with MME if the MME loses the connection so that the service continuity can be assured. Moreover, the number of pending UE contexts or connections in SCEF and/or AS can be decreased.

BRIEF DESCRIPTION OF THE DRAWINGS

The schemes herein are illustrated, by way of example and not by way of limitation, in the figures of the accompanying drawings in which like references indicate similar elements. In the drawings.

DETAILED DESCRIPTION

In the discussion that follows, specific details of particular embodiments of the present disclosure are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or several nodes.

It should be noted that references to "an" or "one" or "some" embodiment(s) in this disclosure are not necessarily to the same embodiment, and such references refer to at least one embodiments.

As used herein, the term "user equipment" refers to any device that can access a wireless communication network and receive services therefrom. By way of example and not limitation, a user equipment (UE) may include, but is not limited to, a mobile phone, a cellular phone, a smart phone, a tablet, a wearable device, a personal digital assistant (PDA), and the like.

The term "network node" used herein refers to a device at the network side and may include a network device via which a terminal device accesses the network and receives services therefrom. By way of example, such a network node may be a base station (BS), a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Figure 1:
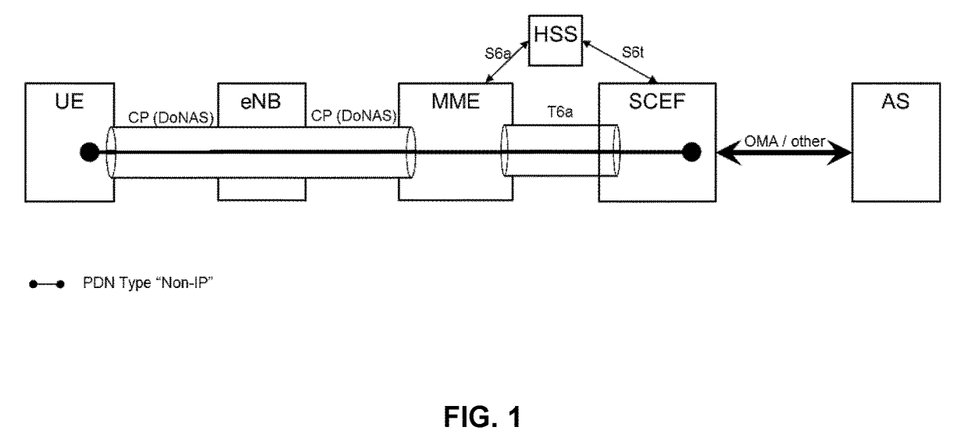
FIG. 1 is a schematic showing a network overview of NIDD over SCEF.

SCEF is a kind of network node for machine type data communication and supports delivery of non-IP data over control plane. Non-IP data transfer over SCEF works for the existing EPC architecture with the support of T6a interface between the MME and SCEF. FIG. 1 illustrates a network overview of NIDD over SCEF. As shown in FIG. 1, a T6a connection can be established towards a selected SCEF when the MME decides to use SCEF-based delivery mechanism for non-IP data delivery to the UE.

With 3GPP evolution, a lot of IoT devices can attach to the EPC network without any PDN connections. Currently, T6a connection can be only established by a UE once the UE requests non-IP PDN connection to SCEF. However, there may be many UEs registered in core network without any PDN connections. For UEs which are registered in network without any PDN connections, even if there are downlink payload data to be transferred from, for example, an application server (AS), the data can't be distributed by SCEF to the UE via the serving MME because there is no available T6a connection between the MME and the SCEF.

Moreover, if the AS has some mobile terminated data to be sent to the UE, there is no way to re-establish the T6a connection towards the MME when the MME is restarted or some failure happened in the MME, which results in inconvenience and poor user experience.

Figure 2:
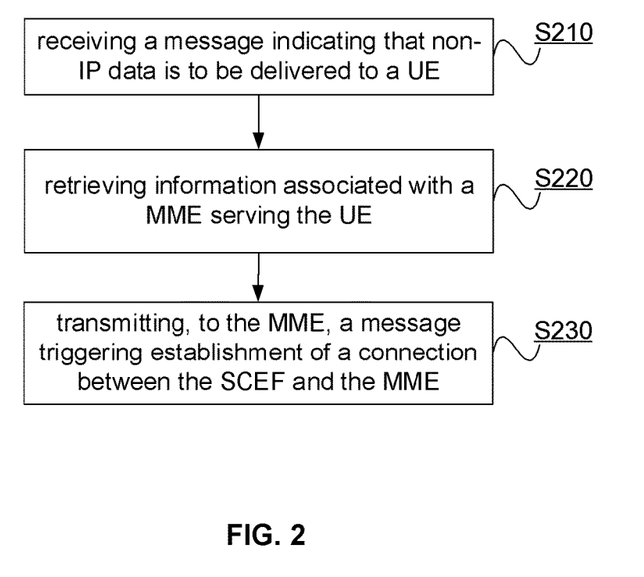
FIG. 2 is a flowchart illustrating a method in a SCEF according to an embodiment of the disclosure.

FIG. 2 is a flowchart illustrating a method in a SCEF according to an embodiment of the disclosure. The details of method of FIG. 2 are elaborated in the following.

At step S210, the SCEF receives a message indicating that non-IP data is to be delivered to a UE. In an embodiment, the SCEF may receive such a message from an AS when, for example, the AS has already activated NIDD service for a UE and has downlink non-IP data to be sent to the UE. For example, such message may be a NIDD Submit Request message.

At step S220, the SCEF retrieves information associated with a MME serving the UE. In an embodiment, the SCEF may transmit a message requesting routing information for the MME to a Home Subscriber Server (HSS), and then receives a message including the routing information from the HSS. Correspondingly, the HSS may receive the request message from the SCEF and obtain the routing information based upon an identity of the UE included in the request message. For example, the routing information may include realm and host for the MME. Then the HSS may send the routing information to the SCEF.

In an embodiment, the SCEF may perform authorization and/or load control before retrieving information associated with the MME. In other words, the UE to which the non-IP data is to be delivered may be authorized by the SCEF firstly and then the SCEF retrieves information associated with a MME serving the UE when the authorization is successful. Alternatively or additionally, load control can be made by the SCEF so as to ensure that there are sufficient resources on the SCEF for establishing the connection between the SCEF and the MME.

At step S230, the SCEF transmits to the MME a message triggering establishment of a connection between the SCEF and the MME for delivering the non-IP data.

In an embodiment, the SCEF may transmits a Connection-Management-Request (CMR) message to the MME, which message requests establishment of the connection between the SCEF and the MME for delivering the non-IP data. Such CMR message may include, for example, an element indicating user identifier (e.g., IMSI) and an element indicating action (e.g., Connection_Establishment).

Further, the SCEF may receive a Connection-Management-Answer (CMA) message from the MME, indicating that the connection between SCEF and MME can be established. The CMA message may include, for example, EPS bearer information (e.g., EPS Bearer Identity).

In another embodiment, the SCEF may transmit a message notifying the MME that non-IP data is requested to be delivered to the UE. Then the SCEF may receive a message indicating that the delivery request of non-IP data to the UE is accepted from the MME. Afterwards, the SCEF may receive a CMR message from the MME, the CMR message requesting establishment of the connection between the SCEF and the MME for delivering the non-IP data to the UE. The SCEF may transmit a CMA message to the MME, indicating that the connection can be established.

With the method shown in FIG. 2 in which establishment of a connection between the SCEF and the MME for delivering downlink non-IP data can be triggered by the SCEF, the downlink non-IP data can be delivered to UE in good time even if there is no connection for such data delivery between SCEF and MME. Meanwhile, the number of pending UE contexts or connections in SCEF and/or AS can be decreased.

Figure 3:
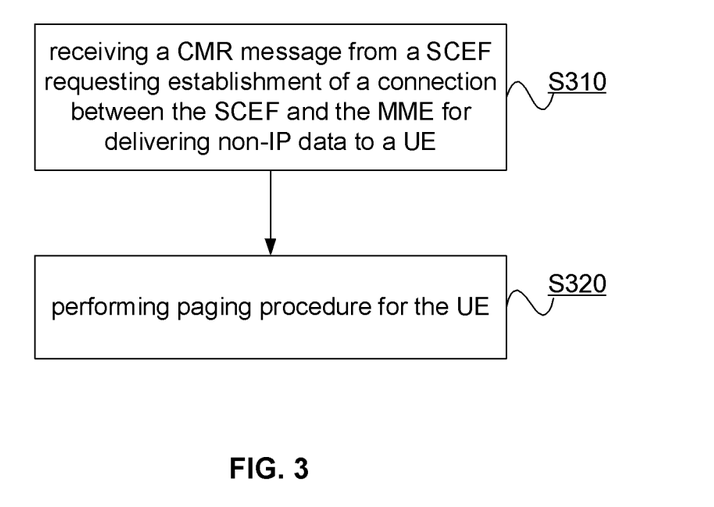
FIG. 3 is a flowchart illustrating a method in a MME according to an embodiment of the disclosure.

FIG. 3 is a flowchart illustrating a method in a MME according to an embodiment of the disclosure. The details of method of FIG. 3 are elaborated in the following.

At step S310, the MME may receive a Connection-Management-Request (CMR) message from a SCEF. The CMR message requests establishment of a connection between the SCEF and the MME for delivering non-IP data to a UE.

At step S320, the MME may perform paging procedure for the UE. If the MME does not have context information for the UE, it may perform International Mobile Subscriber Identification (IMSI) paging. For example, the MME may perform IMSI paging to force UE to reattach when MME restarts. Otherwise, the MME may perform normal paging if there is any UE context replication in MME pool.

Alternatively, the MME may reject the CMR message if the UE cannot be paged due to, for example, the UE being in power saving mode. In this case the MME may page the UE later and then initiate connection establishment to the related SCEF.

In an embodiment, the MME may further transmit, to the SCEF, a Connection-Management-Answer (CMA) message indicating that the connection can be established. The CMA message may include, for example, EPS bearer information (e.g., EPS Bearer Identity). Thereafter, downlink non-IP data can be delivered to the UE over the established connection.

Figure 4:
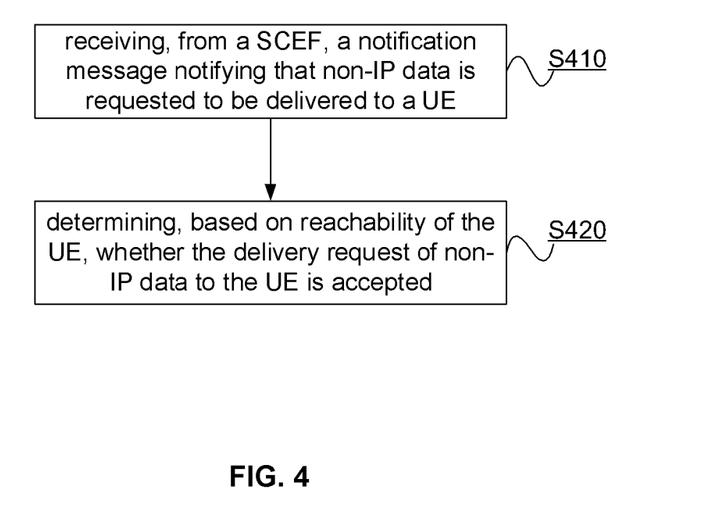
FIG. 4 is a flowchart illustrating a method in a MME according to another embodiment of the disclosure.

FIG. 4 is a flowchart illustrating a method in a MME according to another embodiment of the disclosure. The details of method of FIG. 4 are elaborated in the following.

At step S410, the MME may receive a notification message from a SCEF, which message notifying that non-IP data is requested to be delivered to a UE. For example, the notification message may be a Downlink Data Notification (DDN) message. In an embodiment, the DDN message may be implemented by modifying messages defined in 3GPP TS 29.128 for T6a connection between MME and SCEF, in order to reduce complexity of system implementation. For example, the DDN message may be implemented by modifying MT-Data-Request (TDR) Command so that it does not have non-IP data but instead includes IMSI as the UE identifier.

At step S420, the MME determines, based on reachability of the UE, whether the delivery request of non-IP data to the UE is accepted or not. If it is determined that the UE is reachable, the MME may further transmit to the SCEF a message indicating that the delivery request of non-IP data to the UE is accepted. Such message may be a Downlink Data Notification Acknowledge (DDNA) message. In an embodiment, the DDNA message may also be implemented by modifying messages defined in 3GPP TS 29.128 for T6a connection between MME and SCEF, in order to reduce complexity of system implementation. For example, the DDNA message may be implemented by modifying MT-Data-Answer (TDA) Command so that it includes a result code: 'Success to SCEF'.

If it is determined that the UE is not reachable, the MME may transmit to the SCEF a message indicating that the delivery request of non-IP data to the UE is not accepted. The message may include an element indicating requested re-transmission time for the notification message.

In an embodiment, the MME may further transmit to the SCEF a CMR message requesting establishment of a connection between the SCEF and the MME for delivering the non-IP data. Then the MME may receive, from the SCEF, a CMA message indicating that the connection can be established. Thereafter, downlink non-IP data can be delivered to the UE over the established connection.

With the methods shown in FIGS. 3 and 4, the MME may respond to a trigger message sent from the SCEF for establishment of a connection between the SCEF and the MME for delivering downlink non-IP data. Thus the downlink non-IP data can be delivered to UE in good time even if there is no such a connection between the SCEF and the MME.

Figure 5:
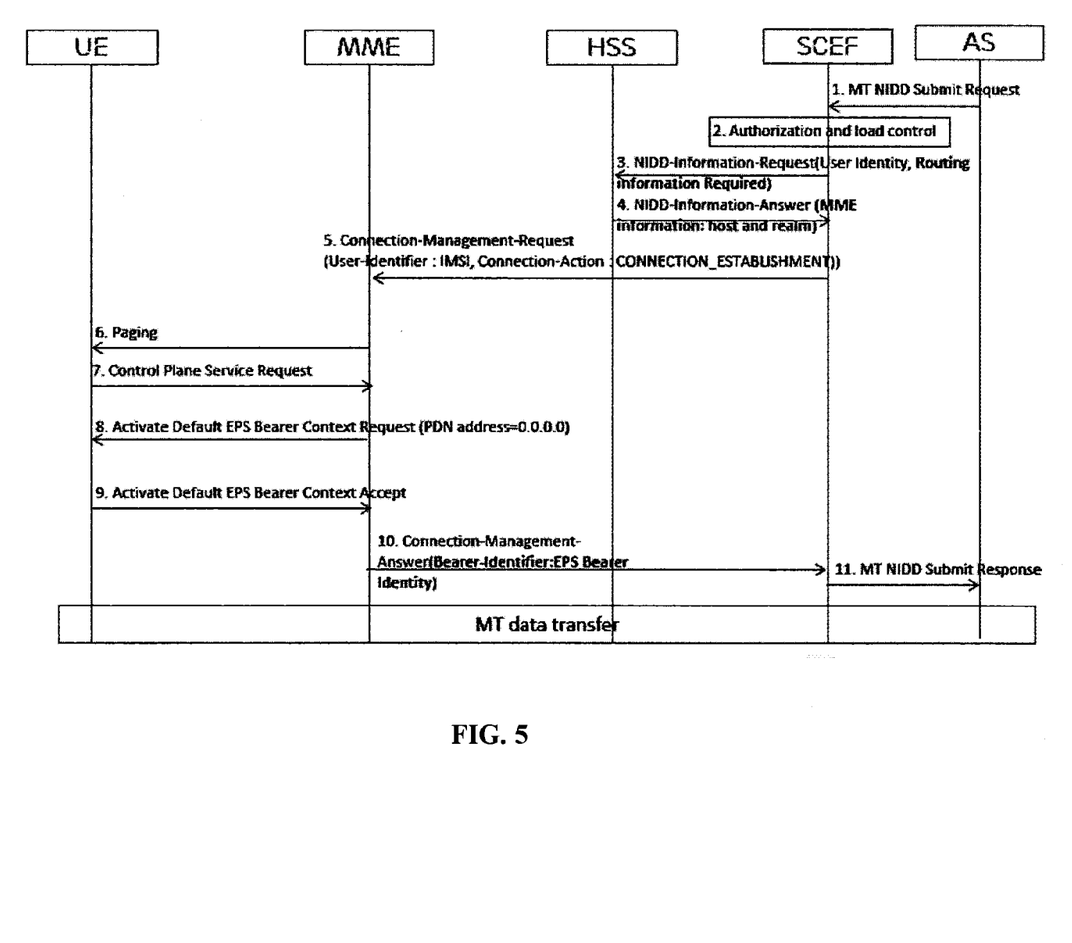
FIG. 5 is a sequence diagram illustrating establishment of a connection between a SCEF and a MME according to an embodiment of the disclosure.
Figure 6:
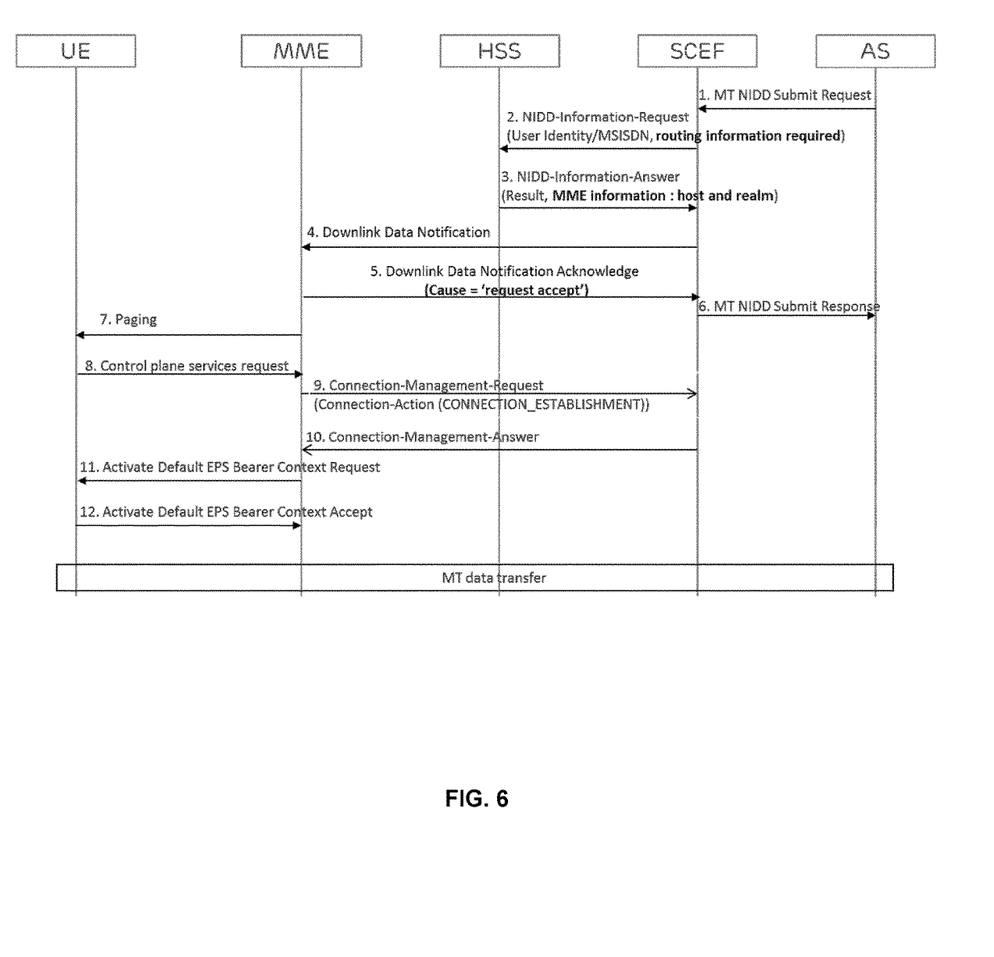
FIG. 6 is a sequence diagram illustrating establishment of a connection between a SCEF and a MME according to another embodiment of the disclosure.

In the next, the proposed schemes of the disclosure will be elaborated in more detail with reference to FIGS. 5 and 6.

FIG. 5 is a sequence diagram illustrating procedure of establishment of a connection between a SCEF and a MME, according to an embodiment of the disclosure. In this embodiment, the connection establishment procedure is triggered by the SCEF using a CMR message in case of that AS has already activated the NIDD service for a given UE and has downlink non-IP data to send to the UE.

Step 1: The SCEF receives a NIDD Submit Request from the AS, indicating that downlink non-IP data is to be delivered to a UE.

Step 2: The SCEF may optionally perform authorization and/or load control for such NIDD Submit Request.

Step 3: The SCEF sends a NIDD-Information-Request to HSS to get routing information for a MME serving the UE.

Step 4: The HSS may respond to the SCEF with routing information for the serving MME, based on user identity in the NIDD-Information-Request. Such routing information may include both realm and host for the MME.

Step 5: The SCEF sends a Connection-Management-Request to MME so as to establish the connection therebetween.

Step 6: The MME pages the UE first if the UE is ECM-Idle. The MME may perform IMSI paging to force UE to reattach when MME restarts or perform normal paging if there is UE context replication in MME pool. If UE can't be paged due to, for example, power saving mode, the MME will reject this CMR and may page the UE later and initiate connection establishment to the SCEF thereafter.

Step 7: The MME receives a Control Plane Service Request from the UE as a paging Response.

Step 8: The MME sends an Activate Default EPS Bearer Context Request message to the UE.

Step 9: The MME receives an Activate Default EPS Bearer Context Accept message from the UE.

Step 10: The MME sends a Connection Management Answer message to the SCEF with the associated EPS Bearer Identity.

Step 11: The SCEF sends a NIDD Submit Response to the AS. Then the mobile terminated (MT) data transfer can be performed over the established connection.

FIG. 6 is a sequence diagram illustrating procedure of establishment of a connection between a SCEF and a MME, according to another embodiment of the disclosure. In this embodiment, the AS has already activated the NIDD service for a given UE and has downlink non-IP data to send to the UE which has no available SCEF PDN connection. The SCEF may send a Downlink Data Notification message to the MME and the MME may perform paging procedure when the UE is reachable.

Step 1: The SCEF receives a NIDD Submit Request from AS, indicating that downlink non-IP data is to be delivered to a UE. Note that even it is not shown in FIG. 6, the SCEF may optionally perform authorization and/or load control for such a NIDD Submit Request, as done in step 2 of FIG. 5.

Step 2: The SCEF sends a NIDD-Information-Request to HSS to get routing information for a MME serving the UE.

Step 3: The HSS may respond to the SCEF with routing information for the serving MME, based on user identity in the NIDD-Information-Request. Such routing information may include both realm and host for the MME.

Step 4: The SCEF sends a Downlink Data Notification (DDN) message to MME to initiate the paging procedure for the UE.

Step 5: If the MME detects that the UE is reachable, it will respond to the SCEF with a Downlink Data Notification Acknowledge (DDNA) message with cause code "Request Accept".

Afterwards, the MME may perform IMSI paging to force UE to reattach when the MME restarts or perform normal paging if there is UE context replication in MME pool. If the MME is aware of that the UE is temporarily unreachable, or if the MME knows that the UE is not reachable for using power saving functions, the MME may send a NIDD Submit Response (temporarily unreachable, Requested Re-Transmission Time) message to the SCEF.

As have been described above, the DDN message and DDNA message may be implemented by modifying messages defined in 3GPP TS 29.128 for T6a connection between MME and SCEF. For example, the DDN message and the DDNA message may be implemented by modifying MT-Data-Request (TDR) Command and MT-Data-Answer (TDA) Command in 3GPP TS 29.128, respectively. The modified TDR Command does not have non-IP data but instead includes IMSI as UE identifier, and the modified TDA Command has a result code: 'Success to SCEF'. For one of ordinary skill in the art, it is understood that the implementation of DDN and DDNA messages is not limited thereto and other types of notification and acknowledge messages are also applicable.

Step 6: The SCEF may send a MT NIDD Submit Response (TTRI, Requested Re-Transmission time, Cause) to the AS, indicating the received results from the MME.

Step 7: The MME starts to page UE in ECM_IDLE.

Step 8: The MME receives a Control Plane Service Request from the UE as a paging response.

Step 9: The MME sends a Connection-Management-Request message to the SCEF.

Step 10: The MME receives a Connection-Management-Answer message from the SCEF.

Step 11: The MME sends an Activate Default EPS Bearer Context Request message to the UE.

Step 12: The MME receives an Activate Default EPS Bearer Context Accept message from the UE. Then the mobile terminated (MT) data transfer can be performed over the established connection.

Figure 7:
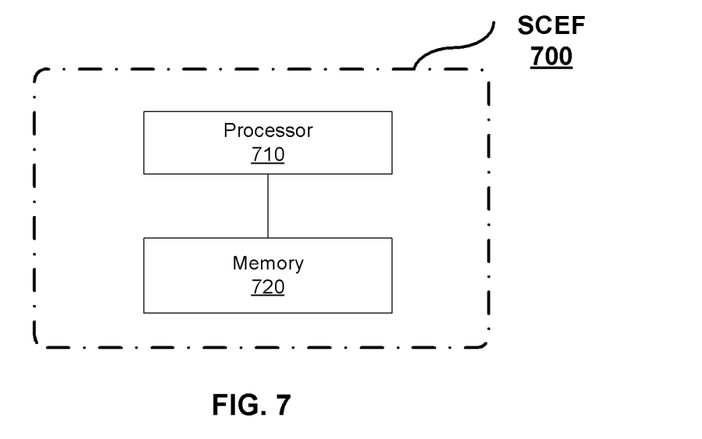
FIG. 7 is a block diagram of a SCEF according to an embodiment of the disclosure.

FIG. 7 is a block diagram of a SCEF according to an embodiment of the disclosure. As shown in FIG. 7, SCEF 700 may comprise a processor 710 and a memory 720 coupled to the processor 710. The memory 720 contains instructions executable by the processor 710 whereby SCEF 700 is operative to perform the methods related to the SCEF as have been described above.

The processor 710 may be implemented, for example, by a CPU (Central processing unit), and could also be implemented by other types of devices. For example, the processor 710 may be implemented by one or more general purpose microprocessors, instruction set processors and/or special purpose microprocessors such as Application Specific Integrated Circuit (ASICs).

The memory 720 may be implemented by various types of storage devices. For example, the memory 720 may be a volatile storage device such as Random Access Memory (RAM). The memory 720 may also be a non-volatile storage device such as Read Only Memory (ROM). One of ordinary skill in the art can envisage that other types of storage devices can be utilized to implement the memory 720.

Figure 8:
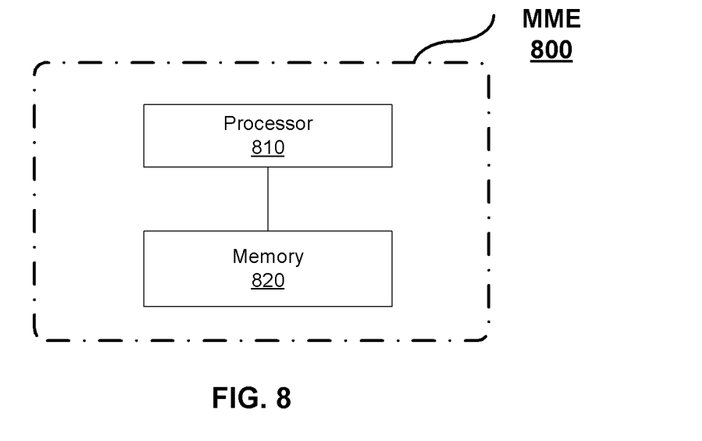
FIG. 8 is a block diagram of a MME according to an embodiment of the disclosure.

FIG. 8 is a block diagram of a MME according to an embodiment of the disclosure. As shown in FIG. 8, MME 800 may comprise a processor 810 and a memory 820 coupled to the processor 810. The memory 820 contains instructions executable by the processor 810 whereby MME 800 is operative to perform the methods related to the MME as have been described above.

The processor 810 may be implemented, for example, by a CPU (Central processing unit), and could also be implemented by other types of devices. For example, the processor 810 may be implemented by one or more general purpose microprocessors, instruction set processors and/or special purpose microprocessors such as Application Specific Integrated Circuit (ASICs).

The memory 820 may be implemented by various types of storage devices. For example, the memory 820 may be a volatile storage device such as Random Access Memory (RAM). The memory 820 may also be a non-volatile storage device such as Read Only Memory (ROM). One of ordinary skill in the art can envisage that other types of storage devices can be utilized to implement the memory 820.

The embodiments of the disclosure can be implemented in computer program products. This arrangement of the disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules.

Figure 9:
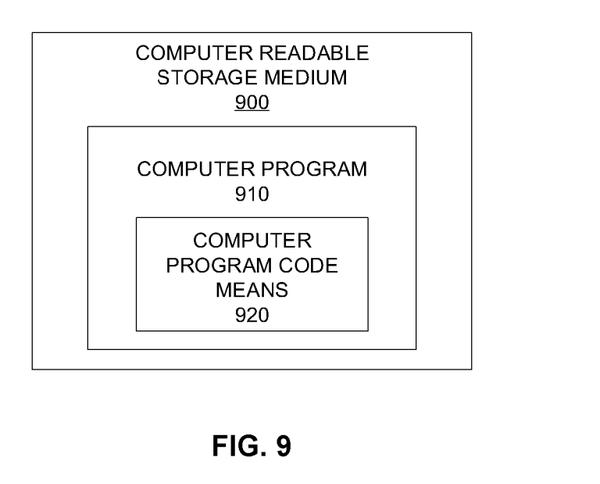
FIG. 9 is a block diagram of a computer readable storage medium having stored thereon a computer program comprising computer program code means according to an embodiment of the disclosure.

FIG. 9 is a block diagram of a computer readable storage medium having stored thereon a computer program comprising computer program code means according to an embodiment of the disclosure. As shown in FIG. 9, a computer readable medium 900 has stored thereon a computer program 910. The computer program 910 comprises computer program code means 920 for performing, when executed by at least one processor, the methods according to the disclosure as mentioned above. The computer readable medium 900 may have the form of a non-volatile or volatile memory, e.g., an Electrically Erasable Programmable Read-Only Memory (EEPROM), a flash memory, a floppy disk, and a hard drive, etc. The computer program code means 920 may include codes/computer readable instructions in any format.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The terms "first" and "second" refer to different elements. The singular forms "a" and "an" are intended to include the plural forms as well, unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In addition, language such as the phrase "at least one of X, Y and Z," unless specifically stated otherwise, is to be understood with the context as used in general to convey that an item, term, etc. may be either X, Y, or Z, or a combination thereof. Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The disclosure has been described with reference to embodiments and drawings. It should be understood that various modifications, alternations and additions can be made by those skilled in the art without departing from the spirits and scope of the disclosure. Therefore, the scope of the disclosure is not limited to the above particular embodiments but only defined by the claims as attached and equivalents thereof.

The invention claimed is:

1. A method in a Service Capability Exposure Function (SCEF), the method comprising:
   receiving a message indicating that non-IP data is to be delivered to a user equipment, UE, wherein the message does not contain the non-IP data;
   retrieving information associated with a Mobility Management Entity (MME) serving the UE; and
   transmitting a Connection-Management-Request (CMR) message to the MME, the CMR message triggering establishment of a connection between the SCEF and the MME for delivering the non-IP data.

2. The method of claim 1, wherein the retrieving comprises:
   transmitting, to a Home Subscriber Server (HSS) a message requesting routing information for the MME; and
   receiving, from the HSS, a message including the routing information.

3. The method of claim 1, wherein
   the CMR message includes an element indicating user identifier and an element indicating action.

4. The method of claim 1, further comprising:
   receiving, from the MME, a Connection-Management-Answer, CMA, message indicating that the connection can be established, the CMA message including Evolved Packet System, EPS, bearer information.

5. The method of claim 4, wherein
   the message indicating that non-IP data is to be delivered to the UE is transmitted by an application server (AS).

6. The method of claim 5, further comprising:
   in response to receiving the CMA transmitted by the MME, transmitting a response to the AS.

7. The method of claim 1, further comprising:
   performing authorization and/or load control before retrieving information associated with the MME.

8. A Service Capability Exposure Function (SCEF), comprising:
   a processor; and
   a memory coupled to the processor and containing instructions executable by the processor whereby the SCEF is operative to perform the method of claim 1.

9. A method in a Mobility Management Entity (MME), the method comprising:
   receiving a Connection-Management-Request (CMR) message transmitted by a Service Capability Exposure Function (SCEF), the CMR message requesting establishment of a connection between the SCEF and the MME for delivering non-IP data to a user equipment (UE); and
   in response to receiving the CMR message transmitted by the SCEF, performing a paging procedure for the UE.

10. The method of claim 9, wherein performing the paging procedure comprises:
    performing International Mobile Subscriber Identification (IMSI) paging if the MME does not have context information for the UE.

11. The method of claim 9, wherein performing the paging procedure comprises:
    rejecting the CMR message if the UE cannot be paged.

12. The method of claim 9, further comprising:
    transmitting, to the SCEF, a Connection-Management-Answer (CMA) message indicating that the connection can be established, the CMA message including Evolved Packet System (EPS) bearer information.

13. A Mobility Management Entity (MME), comprising:
a processor; and
memory coupled to the processor and containing instructions executable by the processor whereby the MME is operative to perform the method of claim 9.

\* \* \* \* \*